(12) United States Patent
Ugolini

(10) Patent No.: US 9,326,530 B2
(45) Date of Patent: May 3, 2016

(54) MACHINE FOR PRODUCING AND DISPENSING PRODUCTS SUCH AS ICE CREAMS, GRANITA OR FROZEN BEVERAGES

(75) Inventor: Marco Corrado Ugolini, Milan (IT)

(73) Assignee: Ugolini Spa, Milan (IT)

( * ) Notice: Subject to any disclaimer, the term of this patent is extended or adjusted under 35 U.S.C. 154(b) by 444 days.

(21) Appl. No.: 13/807,096

(22) PCT Filed: May 12, 2011

(86) PCT No.: PCT/IB2011/052085
§ 371 (c)(1),
(2), (4) Date: Dec. 27, 2012

(87) PCT Pub. No.: WO2012/004687
PCT Pub. Date: Jan. 12, 2012

(65) Prior Publication Data
US 2013/0098098 A1    Apr. 25, 2013

(30) Foreign Application Priority Data

Jul. 8, 2010  (IT) .............................. MI2010A1262

(51) Int. Cl.
*A23G 9/12*    (2006.01)
*A23G 9/22*    (2006.01)
(Continued)

(52) U.S. Cl.
CPC .. *A23G 9/22* (2013.01); *A23G 9/04* (2013.01); *A23G 9/045* (2013.01); *A23G 9/224* (2013.01); *A23G 9/28* (2013.01); *A23G 9/281* (2013.01)

(58) Field of Classification Search
CPC ........ A23G 9/224; A23G 9/281; A23G 9/045

USPC ..................... 62/1, 69, 70, 342, 426; 310/156
See application file for complete search history.

(56) References Cited

U.S. PATENT DOCUMENTS 2,414,521 A * 1/1947 Gunther ................ A47J 31/007
165/63
3,587,350 A * 6/1971 Wanlass ........................ 475/163
(Continued)

FOREIGN PATENT DOCUMENTS

CN   2484748 Y   4/2002
EP   0799575 A1  10/1997
(Continued)

OTHER PUBLICATIONS

PCT International Search Report dated Jul. 25, 2011 for PCT/IB2011/052085, from which the instant application is based, 4 pgs.
(Continued)

*Primary Examiner* — Emmanuel Duke
(74) *Attorney, Agent, or Firm* — Fredrikson & Byron, P.A.

(57) ABSTRACT

A machine for producing products such as ice cream, frozen beverages or granita comprises a product container which is provided with a tap for dispensing the product. A cylinder with a substantially horizontal axis, which forms the evaporator of a refrigerating circuit of the machine for cooling the product in the container, projects from a rear wall into the container. A mixer element is present around the cylinder and rotates coaxially with the axis of the cylinder by means of a motor unit connected to the mixer element by means of a drive shaft which passes along the axis of the cylinder and which is connected to the mixer element at one end of the cylinder which is opposite to the said rear wall. The motor unit is at least partially housed inside the cylinder through the said rear wall, so as to reduce the overall dimensions of the machine.

9 Claims, 1 Drawing Sheet

(51) Int. Cl.
*A23G 9/04* (2006.01)
*A23G 9/28* (2006.01)

(56) References Cited

U.S. PATENT DOCUMENTS

| | | | |
|---|---|---|---|
| 3,818,716 A * | 6/1974 | Carpigiani | A23G 9/16 426/519 |
| 4,575,255 A | 3/1986 | Kafka | |
| 4,900,158 A * | 2/1990 | Ugolini | B01F 7/088 366/143 |
| 5,419,150 A * | 5/1995 | Kaiser et al. | 62/342 |
| 5,906,105 A * | 5/1999 | Ugolini | A23G 9/045 366/274 |
| 6,082,123 A | 7/2000 | Johnson | |
| 6,095,677 A | 8/2000 | Karkos, Jr. et al. | |
| 6,163,095 A | 12/2000 | Shams et al. | |
| 6,467,944 B2 * | 10/2002 | Ugolini | A23G 9/045 366/144 |
| 6,619,056 B2 * | 9/2003 | Midden et al. | 62/136 |
| 2004/0226305 A1 * | 11/2004 | Grampassi | A23G 9/045 62/135 |

FOREIGN PATENT DOCUMENTS

| | | |
|---|---|---|
| EP | 1262724 A2 | 12/2002 |
| EP | 1459666 A1 | 9/2004 |
| EP | 1477455 A1 | 11/2004 |
| ES | 2166248 A1 | 4/2002 |
| JP | 11253105 A | 9/1999 |
| JP | 2001178370 A | 7/2001 |
| WO | 03082022 A1 | 10/2003 |

OTHER PUBLICATIONS

Italian Search Report and Opinion dated Mar. 2, 2011 for IT MI201001262, from which the instant application is based, 8 pgs.

* cited by examiner

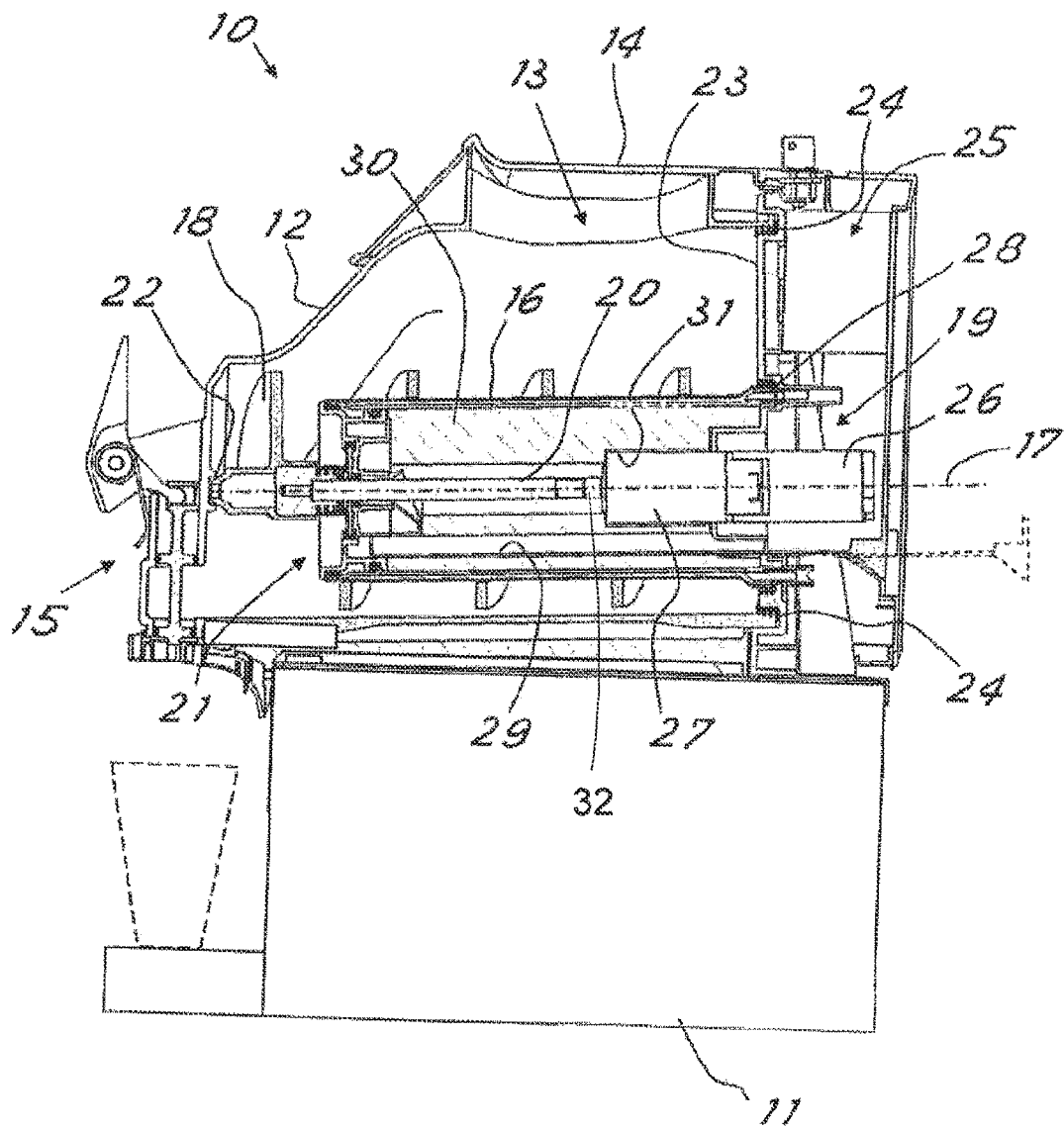

MACHINE FOR PRODUCING AND DISPENSING PRODUCTS SUCH AS ICE CREAMS, GRANITA OR FROZEN BEVERAGES

RELATED APPLICATIONS

This application is a 35 U.S.C. 371 national stage filing from International Application No. PCT/IB2011/052085 filed May 12, 2011 and claims priority to Italian Application No. MI2010A001262 filed Jul. 8, 2010, the teachings of which are incorporated herein by reference.

FIELD OF THE INVENTION

The present invention relates to a machine for producing and dispensing products such as ice creams, granita or frozen beverages, of the type comprising a container for the product, which has a cooling evaporator cylinder around which a motor-driven mixer element rotates.

BACKGROUND

Usually, in machines of the prior art the mixer element is operated by a shaft which passes through the rear wall of the container axially with respect to the evaporator cylinder so as to reach a motor unit or speed reducer which is arranged in the rear part of the machine, behind the product container. The rear part of the machine is therefore very deep, in order to contain said speed reducer.

In an attempt to reduce the overall dimensions, machines have been proposed in the prior art where the speed reducer extends substantially vertically (namely in a direction transverse to the axis of rotation of the mixer element), for example with a gear train which displaces the axis of the motor downwards with respect to the axis of the mixer. In some known solutions, the axis is displaced to the point of allowing the motor to be housed underneath the container. This, however, results in the motor occupying the space in the base of the machine where the machine refrigerating circuit is also housed. This results in the need for a larger sized base and constitutes a constraint for the arrangement of the parts of the refrigerating circuit.

BRIEF SUMMARY OF EMBODIMENTS OF THE INVENTION

The main object of the present invention is to provide a machine of the abovementioned type, but with a reduction in the volume resulting from the motor unit.

In view of this object, according to the invention, a machine for producing and dispensing products such as ice cream, frozen beverages or granita has been provided, said machine comprising a product container which is provided with a tap for dispensing the product and into which there projects, from a rear wall, a cylinder with a substantially horizontal axis which forms the evaporator of a refrigerating circuit of the machine for cooling the product in the container, a mixer element for stirring the product being present around the cylinder so as to rotate coaxially with the axis of the cylinder by means of a motor unit, which is arranged outside the container and which rotates the mixer element by means of a drive shaft which passes along the axis of the cylinder and which is connected to the mixer element at one end of the cylinder which is opposite to the said rear wall, characterized in that the motor unit is at least partially housed inside the cylinder through the said rear wall.

BRIEF DESCRIPTIONS OF THE DRAWING

In order to illustrate more clearly the innovative principles of the present invention and its advantages compared to the prior art, an example of embodiment applying these principles will be described below, with the aid of the sole attached drawing.

DETAILED DESCRIPTION OF EMBODIMENTS OF THE INVENTION

With reference to the FIGURE, this shows a machine, denoted generally by 10, for producing and dispensing ice creams, frozen beverages, granita and the like.

The machine 10 comprises a base 11 on which a container 12 is mounted, said container being usually made of transparent plastic and provided with a top opening 13 which is advantageously closed by a lid 14 fitted with a key and having a front tap 15 for controlled dispensing of the product.

The container 12 has inside it an evaporator 16 of a refrigerating circuit (of the known type and therefore not described or shown in detail), the other parts of which are advantageously contained in the base 11. The evaporator is in the form of a hollow cylinder with a substantially horizontal axis 17 and projects into the container from an end wall 23.

Inside the container there is a mixer element 18 which is in the form of a cylindrical propeller which surrounds the evaporator cylinder 16 and rotates coaxially therewith by means of a motor unit 19 situated outside the container and connected to the mixer element 18 by means of shaft 20 which passes through the cylinder along the axis 17 and enters into the container, via seals 21, at the free front end of the cylinder 16. Advantageously, the mixer element rests with its end against a seat 22 formed in the inner wall of the container in front of the free end of the cylinder. The mixer element is of the type known per se intended to simultaneously mix the product, assist formation and dispensing thereof and prevent the formation of deposits on the outer wall of the cooling cylinder.

Again advantageously, the container is connected to the end wall 23 in a removable manner by means of seals 24 so that the end wall 23 (vertically projecting from the base 11) also forms a fixed rear closing wall of the container. A closed space 25 is formed behind the end wall 23 for the machine parts, such as electronic control boards, etc.

The evaporator cylinder 16 is sealed off from the product inside the container by means of a seal 28, situated along the connection between cylinder and rear wall 23, and the front seals 21. This also ensures that the various parts of the machine may be disassembled, as can be easily imagined by the person skilled in the art.

The motor unit is at least partially housed inside the evaporator cylinder 16 via the rear wall 23. Preferably the motor unit is fixed so as to project from the wall 23.

Advantageously, the motor unit 19 is formed with an electric motor 26 which has its axis of rotation coaxial with the axis 17 of the cylinder and the drive shaft 20 and the front part of the motor unit may contain a suitable gear reduction unit 27 (of the type known per se) with its input and output 32 coaxial with the axis 17.

The motor unit thus has a form (advantageously cylindrical) which extends preferably along the axis 17. The electric motor may be of the brushless type for a more advantageous size/power ratio and better electronic control of the speed during the various product preparation and dispensing phases.

Preferably, the inner wall of the cylinder is lined with a layer 30 of heat-insulating material in which a seat 31 for the motor unit and the coaxial drive shaft is formed. The layer 30, which isolates acoustically at least partly the motor unit, is also able to reduce the noise level of the machine and dampens any operating vibrations of the motor unit.

Advantageously, inside the cylinder and in a position below the axis 17 and the motor unit 19 there is a tray 29 (extractable towards the rear of the machine as shown in broken lines) for collecting liquid which could form, for example as a result of condensation or seepage, inside the cylinder.

At this point it is clear how the predefined objects have been achieved. By using the space inside the evaporator cylinder to contain at least part of the motor unit (designed with a form which extends preferably along the axis of rotation 17, instead of transversely, as instead usually occurs in the prior art) it is possible to reduce significantly the rear volume of the machine behind the container and its mechanical structure is simplified. The space freed at the rear may be used both to house other parts of the machine and to provide a machine having the part behind the container with a smaller depth. This enables the overall dimensions of the machine to be optimized with respect to the capacity of the container.

Moreover, the base remains fully available for the other parts of the machine and, in particular, the refrigerating unit.

If necessary, the entire motor unit may be housed inside the evaporator cylinder.

Obviously, the above description of an embodiment applying the innovative principles of the present invention is provided by way of example of these innovative principles and must therefore not be regarded as limiting the scope of the rights claimed herein. For example, the exact form and proportion of the various parts of the machine may vary depending on the specific technical and aesthetic requirements.

The invention claimed is:

1. Machine for producing and dispensing products including ice cream, frozen beverages or granita, comprising a product container which is provided with a tap for dispensing product and into which there projects, from a rear wall, a cylindrically-shaped evaporator of a refrigerating circuit of the machine for cooling the product container with a substantially horizontal axis wherein the product is dispensed from the tap in a direction perpendicular to the horizontal axis of the cylindrically-shaped evaporator, a mixer element of a propeller type for stirring the product present around the cylindrically-shaped evaporator so as to rotate coaxially with the axis of the cylindrically-shaped evaporator by means of a motor unit, the motor unit being arranged outside the container and adapted to rotate the mixer element by means of a drive shaft which passes along the axis of the cylindrically-shaped evaporator and which is connected to the mixer element at one end of the cylindrically-shaped evaporator which is opposite to the said rear wall, wherein the motor unit is at least partially housed inside the cylindrically-shaped evaporator through the said rear wall, the motor unit comprising a motor and a gear reduction unit, the gear reduction unit connected in front of the motor and including an output which is connected coaxially to said drive shaft, the cylindrically-shaped evaporator comprising a space defined therein, the gear reduction unit being at least partially housed inside the space inside the cylindrically-shaped evaporator, and the space inside the cylindrically-shaped evaporator which receives at least partially the gear reduction unit is sealed from the inside of the product container.

2. The machine of claim 1, wherein the motor has an axis of rotation arranged substantially coaxially with the axis of the cylindrically-shaped evaporator.

3. The machine of claim 2, wherein the motor is an electric motor.

4. The machine of claim 1, wherein the inner wall of the cylindrically-shaped evaporator is lined with a layer of heat-insulating material in which a seat for the motor unit and for receiving the coaxial drive shaft is formed.

5. The machine of claim 1, wherein the motor unit extends along the axis of the cylindrically-shaped evaporator.

6. The machine of claim 1, wherein the gear reduction unit is located entirely inside the cylindrically-shaped evaporator.

7. The machine of claim 6, wherein the motor extends at least partially inside the cylindrically-shaped evaporator.

8. The machine of claim 7, wherein the motor is an electric motor.

9. The machine of claim 1, wherein the cylindrically-shaped evaporator has a front end and a rear end, the front end of the cylindrically-shaped evaporator being proximal to the tap, the rear end being opposite to the front end, the rear end being proximal to the rear wall of the container, and wherein the mixer element is proximal to the front end of the cylindrically-shaped evaporator.

\* \* \* \* \*